US010672217B2

(12) United States Patent
Koenigsknecht et al.

(10) Patent No.: US 10,672,217 B2
(45) Date of Patent: Jun. 2, 2020

(54) PRODUCT DISPENSING DEVICE

(75) Inventors: Tony Lee Koenigsknecht, Chicago, IL (US); Ken Eric Maisonville, Saint Joseph, MI (US); Paul Joseph Gray, South Bend, IN (US); Albert John Kohn, Bridgman, MI (US); Scott Alan Albright, Buchanan, MI (US)

(73) Assignee: Freeosk, Inc., Chicago, IL (US)

( * ) Notice: Subject to any disclaimer, the term of this patent is extended or adjusted under 35 U.S.C. 154(b) by 539 days.

(21) Appl. No.: 13/100,595

(22) Filed: May 4, 2011

(65) Prior Publication Data

US 2012/0104034 A1 May 3, 2012

Related U.S. Application Data

(60) Provisional application No. 61/331,183, filed on May 4, 2010.

(51) Int. Cl.

| | |
|---|---|
| ***B65B 1/12*** | (2006.01) |
| ***G01F 11/00*** | (2006.01) |
| ***B65B 1/30*** | (2006.01) |
| ***G07F 11/44*** | (2006.01) |
| ***G07F 13/02*** | (2006.01) |

(52) U.S. Cl.
CPC ............ *G07F 11/44* (2013.01); *G07F 13/025* (2013.01)

(58) Field of Classification Search
CPC ........... B65B 1/12; G07F 11/44; G07F 13/025
USPC ......... 221/222, 237, 265, 138, 263; 700/232
See application file for complete search history.

(56) References Cited

U.S. PATENT DOCUMENTS

| | | | | | |
|---|---|---|---|---|---|
| 1,495,178 | A | * | 5/1924 | Hodgdon | 222/167 |
| 2,969,650 | A | | 1/1961 | Eschenburg et al. | |
| 3,508,680 | A | * | 4/1970 | Casey | B65G 47/00 221/258 |
| 4,074,507 | A | * | 2/1978 | Ruf | B65B 1/12 141/103 |
| 4,320,855 | A | * | 3/1982 | Ricciardi | G05D 7/0605 177/185 |
| RE32,101 | E | * | 4/1986 | Ricciardi et al. | 222/56 |
| 4,614,162 | A | * | 9/1986 | Ryan et al. | 118/19 |
| 4,763,702 | A | * | 8/1988 | High et al. | 141/114 |
| 4,792,424 | A | * | 12/1988 | Loman | B29C 45/63 264/102 |

(Continued)

FOREIGN PATENT DOCUMENTS

WO 2009/137025 A1 11/2009

OTHER PUBLICATIONS

PCT International Preliminary Report on Patentability; dated Nov. 6, 2012; 1 page.

(Continued)

*Primary Examiner* — Michael Collins
(74) *Attorney, Agent, or Firm* — Seyfarth Shaw LLP

(57) ABSTRACT

A system, device and method for dispensing a product includes a delivery system that includes at least one auger with internal flighting that is either integral with or attached to an internal wall of a barrel portion of the auger. The auger rotates and the spiral flighting within the auger transmits a product from a bulk loading station to a product dispensation area. Thus, products can be bulk loaded into a device rather than having to be loaded one-by-one into a dispensing device. The spiral flighting reduces pinch points associated with conventional auger systems.

10 Claims, 12 Drawing Sheets

(56) References Cited

U.S. PATENT DOCUMENTS

| | | | | | |
|---|---|---|---|---|---|
| 4,944,334 | A | | 7/1990 | McGregor | |
| 5,240,324 | A | * | 8/1993 | Phillips | B01F 5/265 222/55 |
| 5,353,914 | A | * | 10/1994 | Stephen et al. | 198/443 |
| 5,381,967 | A | * | 1/1995 | King | 239/659 |
| 5,427,224 | A | * | 6/1995 | Suehara | B65G 47/248 198/396 |
| 5,547,276 | A | * | 8/1996 | Sulzbach | B01F 15/0412 366/139 |
| 5,671,262 | A | * | 9/1997 | Boyer et al. | 377/11 |
| 5,765,676 | A | * | 6/1998 | Kalm | B65G 47/1428 198/396 |
| 5,884,806 | A | * | 3/1999 | Boyer et al. | 221/75 |
| 6,237,309 | B1 | * | 5/2001 | DeMarco | 53/502 |
| RE37,405 | E | * | 10/2001 | Shirodera | 221/166 |
| 6,994,464 | B2 | * | 2/2006 | Villwock | B01D 19/0052 366/136 |
| 7,108,155 | B2 | * | 9/2006 | Kelbert et al. | 221/167 |
| 7,624,894 | B2 | * | 12/2009 | Gerold | G07F 11/44 221/123 |
| 7,743,699 | B1 | * | 6/2010 | Freeman et al. | 100/73 |
| 7,853,355 | B1 | * | 12/2010 | Willemse | G07F 9/026 700/232 |
| 8,066,150 | B2 | * | 11/2011 | Clarke | G07F 11/005 221/198 |
| 8,392,020 | B2 | * | 3/2013 | Terzini | 700/243 |
| 8,733,121 | B2 | * | 5/2014 | Soderman | F25C 1/00 221/221 |
| 2003/0220713 | A1 | | 11/2003 | Owens | |
| 2004/0008571 | A1 | * | 1/2004 | Coody | B01F 3/1221 366/154.1 |
| 2005/0263537 | A1 | * | 12/2005 | Gerold et al. | 221/124 |
| 2009/0281657 | A1 | * | 11/2009 | Gak et al. | 700/242 |
| 2010/0282780 | A1 | * | 11/2010 | Babiarz | 222/226 |

OTHER PUBLICATIONS

PCT Written Opinion of the International Searching Authority, dated Aug. 2, 2011, 5 pgs.

Office Action dated Dec. 9, 2013 for Canadian Patent Application 2,798,191 which is Applicant's corresponding application in Canada.

Intellectual Property Office Examination Report, dated Dec. 22, 2015; 5 pages.

* cited by examiner

PRODUCT DISPENSING DEVICE

RELATED APPLICATION

This application claims the priority of, and hereby incorporates by reference, provisional application Ser. No. 61/331,183 filed May 4, 2010.

TECHNICAL FIELD OF THE INVENTION

The present invention relates generally to product dispensing devices, and more particularly, to product dispensing kiosks capable of dispensing a single product to a consumer.

BACKGROUND OF THE INVENTION

A popular marketing technique to sell products is to provide free samples to potential customers in order to entice the customers to buy the product. The free sample can be provided to the customer by an employee of, for example, a grocery store during regular working hours while the customer is otherwise shopping for other products. The store employee can then sell the customer the product by pointing the customer to the area of the store where that product is sold, typically close to where the free sample is provided. This marketing tool is especially popular for products that have only recently entered the market or where potential customers are not likely to have sampled the product through conventional means.

The free sample dispensing process discussed above requires a store employee to be stationed next to the free samples and to deliver the free samples to the customers. This added cost can further increase the price of marketing a new product and delivering the free sample to the customer. Thus, a need exists for an automated free sample dispensing system.

Product delivery systems are a popular form of dispensing consumables to a buyer. For example, soda machines provide an automated way to sell a container of soda to a customer by accepting the customer's money and dispensing the soda in a dispensing area, typically below the area where the buyer inserts their money. To load the machine with consumer goods, soda machines require a serviceman to insert the sodas seriatim into a pathway from which the sodas are dispensed to the customer. Similarly, food vending machines typically involve a rotating spiral, where food products are disposed between the coils of the spiral in a serial manner and dispensed by rotation of the spiral.

The above system for dispensing consumer products include the drawback that products must be dispensed seriatim, or one-by-one within the product delivery system, thus necessitating the costly and time consuming process of loading the product in the dispenser. A serviceman must individually load each can of soda, or, each food product into the machine, in order for the machine to work properly and dispense the product effectively.

Also, the above methods of dispensing a product are typically tailored to a product of a known size and shape (e.g., the soda example above). The known product dispensing methods do not adapt themselves to products of varying shapes and sizes that are bulk loaded into a receiving bin, e.g. a hopper.

The above product dispensation methods also require distribution devices with several pinch points. These pinch points can cause significant damage to a product when the product is dispensed through the conventional systems.

SUMMARY OF THE INVENTION

The present application discloses a system that allows bulk loading of products, for example, free samples, into a product-dispensing device where products can be delivered individually but loaded in bulk without regard to orientation of each individual product. In particular, the present application discloses a product dispensing device including a base, a frame disposed within an interior of the base, a hopper including an opening allowing an object to be dispensed therethrough, the hopper being accessible within an exterior of the base, and at least one auger having first and second open ends and being coupled to the frame and rotatable thereon, the first open end of the at least one auger being structured to receive the object dispensed through the opening of the hopper, wherein the at least one auger includes a barrel portion and flighting extending at least partially between the first and second open ends of the at least one auger, the flighting being one of integral with and attached to the barrel portion.

Also disclosed is a delivery system device, including a hopper having an opening that allows for products to be dispensed therethrough, a frame having a bulk auger and a delivery auger coupled thereto and rotatable thereon, at least one of the bulk auger and the delivery auger having a barrel portion and flighting that is one of integral with and attached to an internal wall of the barrel portion, wherein a first open end of the bulk auger is adapted to receive objects from the hopper, and a first open end of the delivery auger is adapted to receive objects from the bulk auger.

A method of dispensing a product is also disclosed and includes depositing the product in a hopper, activating a first motor to rotate a bulk auger so as to transfer the product from the hopper through the bulk auger, transferring the product from the bulk auger to the delivery auger, activating a second motor to transfer the product through the delivery auger, and transporting the product from the delivery auger into a dispensation area.

In addition, a product delivery apparatus is disclosed that includes a hopper adapted to hold a plurality of products, a plurality of augers movably disposed on a frame and indirectly communicating with one another and with the hopper along a communication path, and a dispensation area provided at an end of the communication path, wherein at least one of the augers is positioned at an angle of approximately 0 degrees to approximately 30 degrees with respect to the ground plane.

BRIEF DESCRIPTION OF THE DRAWINGS

For the purpose of facilitating an understanding of the subject matter sought to be protected, there is illustrated in the accompanying drawing embodiments thereof, from an inspection of which, when considered in connection with the following description, the subject matter sought to be protected, its construction and operation, and many of its advantages should be readily understood and appreciated.

DETAILED DESCRIPTION OF PREFERRED EMBODIMENTS

Figure 1:
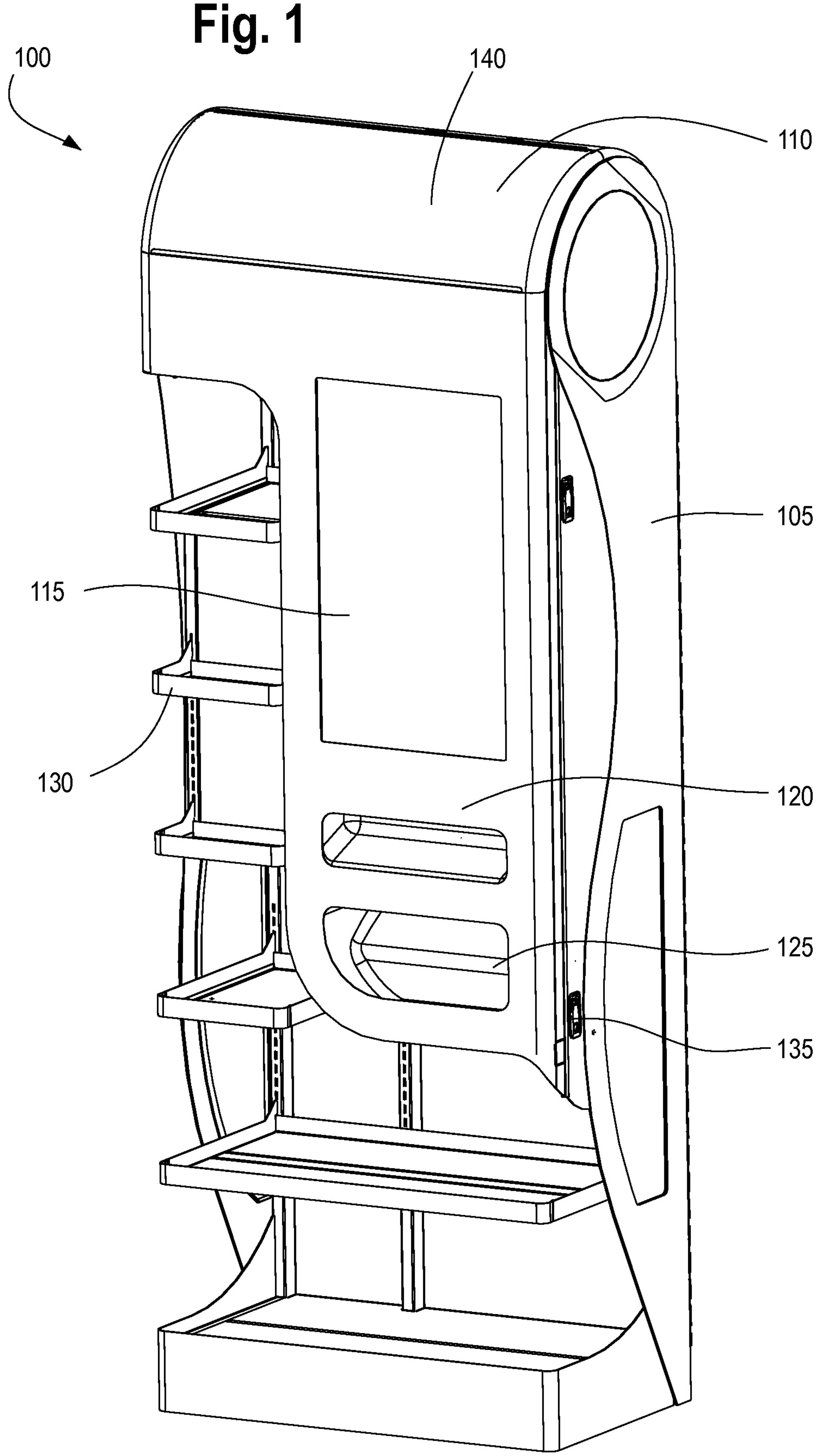
FIG. 1 illustrates an embodiment of the product dispensing device.

While this invention is susceptible of embodiments in many different forms, there is shown in the drawings and will herein be described in detail a preferred embodiment of the invention with the understanding that the present disclosure is to be considered as an exemplification of the principles of the invention and is not intended to limit the broad aspect of the invention to embodiments illustrated.

The present invention includes an apparatus, method and system for dispensing products, for example, free sample products, to a consumer. The present invention allows for bulk loading of the products without regard to the orientation, size or shape of the product by providing a bulk hopper where a serviceman may load products into the present invention without requiring the products to be loaded one-by-one. The present invention also provides functionality that dispenses the products individually to consumers in a controlled and efficient manner. The present invention thus reduces the time and effort needed to load products into the disclosed device, and allows products, such as free samples, to be dispensed to a consumer with ease and efficiency. The unique structure of the present invention also reduces the amount of product and packaging damage regardless of the size, weight, or shape of the product or packaging.

The inventors of the present application discovered that a multiple inverted auger system can improve efficiency by combining the individual efficiency of each auger. During experimentation, it was discovered that a first auger will distribute products at 70% efficiency (i.e., 70% of the test runs distributed one product, while 30% of the test runs distributed two to five products). Also, a second auger would individually distribute products at 80% efficiency. The second auger's increased efficiency was attributable to fewer products being transmitted through the auger. However, in combination, the two augers would enjoy more than 90% efficiency due to the combined individual efficiency of the two augers. Although two augers are used in this system, a primary bulk auger could be used in series with another singulation/dispensing device. Additionally, more than two augers may be used to further improve efficiency in the case of smaller products or products that are more susceptible to decreased efficiency.

As shown in FIG. 1, a product dispensing device 100 is provided and includes a base 105 and a hopper 110 disposed at the top of the base 105. A touch-screen display 115, or other display, may be included at eye level to a user and above a scanner 120 that is capable of scanning a card carried by a user, for example, a magnetic, bar code, or RFID card. Below the scanner 120 is provided a dispensation area 125 where products are delivered when the process according to the present invention is complete. For holding products, a shelf 130 is provided on the side of the base 105. To allow access to the internal components of the product dispensing device 100, a portion of the front of the base 105 may be coupled to the base, such as with hinges, and latched on the side with latches 135. In addition, an access point 140 can be provided adjacent or within the hopper 110 to allow for wireless or wired communication between the product dispensing device 100 and an external computer system.

The base 105 acts as the structural backbone of the product dispensing device 100 and can be made of any material, for example, metal, plastic, wood, or any other substance that allows for structural stability. In a preferred embodiment, the base 105 is made of a powder-coated steel. As discussed above, the base 105 includes shelves 130 for holding products, and includes several openings for the user to scan a card (below the scanner 120), for the user to obtain the product dispensed (in the dispensation area 125), and an opening for a touch-screen display 115, such as a touch-screen display that is capable of interacting with the customers.

The hopper 110 is coupled to the base 105, and as described below with respect to FIG. 5, includes a hinged portion and a support portion. Products can be loaded into the product dispensing device 100 by placing the products inside an opening of the hopper 110 which, as described below, communicates with internal features of the present invention to distribute the product to a consumer. The hopper 110 can be opened by the hinged portion and products can be distributed into the opening for future dispensation. Various ribs or deflector plates can also be provided inside the hopper 110 to control the flow of products from the hopper into the remainder of the product dispensing device 100.

Adjacent or inside the hopper 110 is the access point 140 which is operably coupled to an external computer. The access point 140 may include a transceiver that is capable of communicating through wired and/or wireless communications, for example, a telephone or Internet connection, a DSL connection, a cable connection, a 3G, 4G or other cellular communication method, a 802.11 wireless connection, or any other form of electronic communication.

The access point can communicate with an external computer to send the external computer data from the product dispensing device 100. For example, the access point 140 can transmit to the external computer data relating to the amount of product remaining in the product dispensing device 100, the number of scans on a particular day, what identification cards were scanned on a particular day, individual purchasing behavior of relevant consumers, or any other type of data that may be deemed useful. In addition, the external computer can communicate with the access point 140 to deliver information to the product dispensing device 100. For example, the external computer can communicate software updates to the product dispensing device 100 via the access point 140, or can communicate new instructions to the product dispensing device 100 that change the video or image displayed on the display 115. A service technician can also update the video or image displayed on the display 115 by scanning a "Program Changeover Instructional" card (or other identifying indicia) in the scanner 120 to effectively change the marketing material on the display 115 with the simple scan of a card.

The display 115 can visually depict video or images relating to the product that is dispensed from the product dispensing device 100, and can further display information for the user. For example, the display 115 can provide an advertisement for the product being dispensed and can include the instructions "Scan Card Now" or "Push Here for Instructions on How to Obtain a Card." By way of example, the display 115 can include a liquid crystal display (LCD), organic light-emitting diode (OLED) display, plasma screen, cathode ray tube display, or any other kind of black and white or color display that will allow the user to view and interpret information on the product dispensing device 100 and may further include touch-screen capabilities.

The scanner 120 can be any electrical, optical, RFID or electromagnetic device that can read a card or other sort of identification means. For example, the scanner 120 can be a bar code scanner, a magnetic card reader, a fingerprint reader, a magnetic strip reader, a smart card reader, RFID reader, or any other form of apparatus that allows identification to be verified. In a preferred embodiment, the scanner 120 is a barcode scanner that reflects light off of a barcode through an opening in the base 105 on to the user's card. Alternatively, the scanner 120 can transmit light off of a mirror or set of mirrors and on to the user's card. The light from the scanner 120 can either be constantly transmitted to the area at which the user scans a card, or can be activated once a sensor is tripped to notify the sensor that a card is present.

As discussed herein, the user can scan a card with an identification number to dispense a product from the product dispensing device 100. In a preferred embodiment, the card is capable of being scanned by a barcode reader. However, the card can be any form of electrical, optical or electromagnetic card capable of being scanned by the scanner 120. Further, the card need not be a free sample card, but can be a credit card, debit card, or other form of card capable of transmitting money, points, or other currency derivative to the product dispensing system 100. A user can also verify their identity without a card, for example, by scanning a fingerprint or other biometric identifier, by using a mobile phone to send a text message, by transmitting identifying data via a Bluetooth connection, by user input to the display 115, or any other user activation method.

The dispensation area 125 can be provided below the scanner 120 and can be the end point of products dispensed through the product dispensing device 100. When products are delivered to the dispensation area 125, a light may flash to alert the user that the product has arrived. Alternatively, the display 115 or a sound can alert the user that their product is in the dispensation area 125, or such alerts can be provided by emitting a sound.

One or more shelves 130 can be provided on the base 105 to hold products thereon. As shown, the shelves 130 are provided on the side and the bottom of the base 105. However, the product dispensing device 100 need not have any shelves 130, or such shelves 130 can be provided independent of the product dispensing device 100 (for example, on standard shelving at grocery stores) to allow for a smaller footprint of the product dispensing device 100.

Figure 2A:
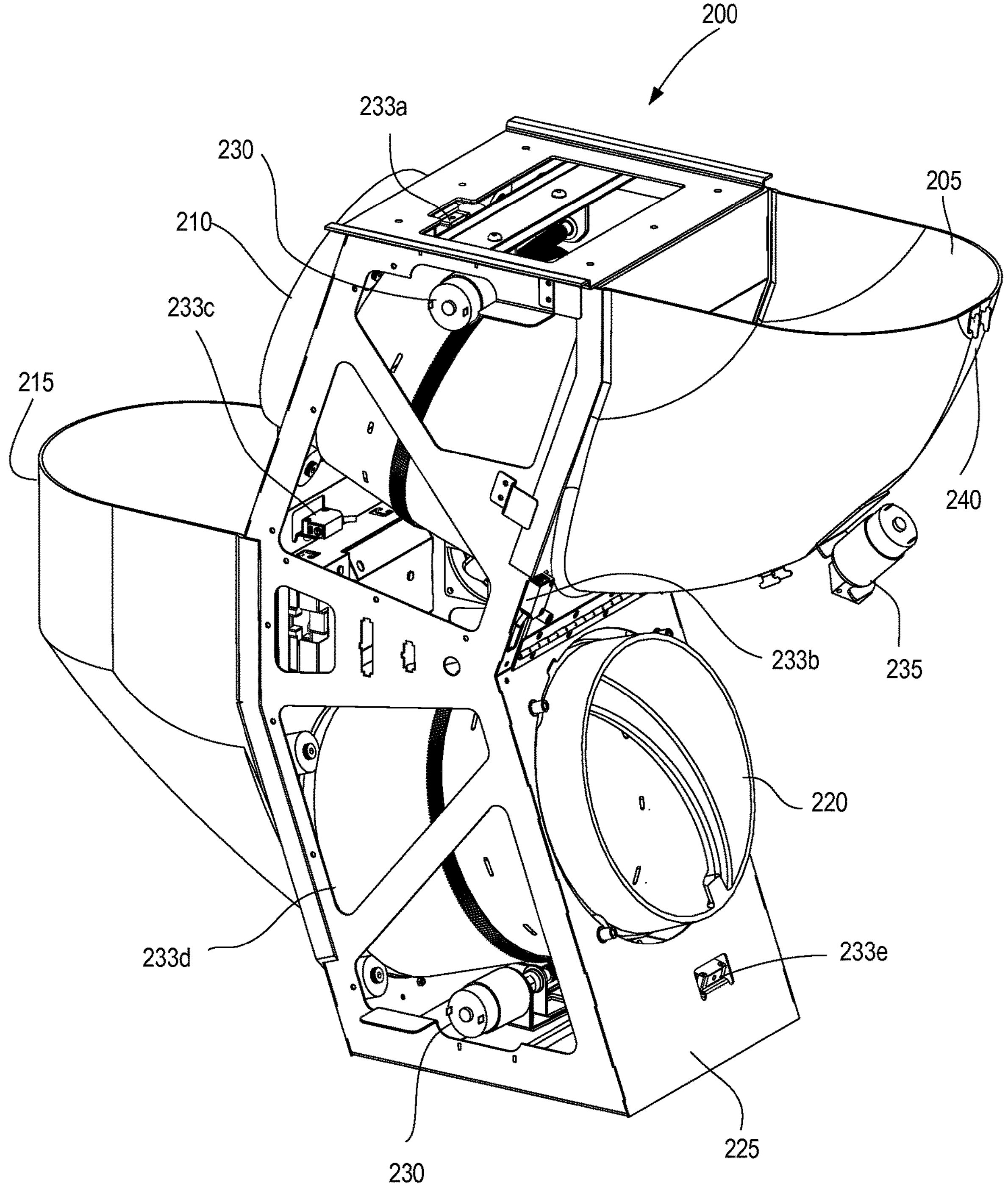
FIGS. 2A-2B illustrate a delivery system according to the present application.

The delivery system 200 of the present invention will now be discussed with reference to FIGS. 2A-2C. As shown, the delivery system 200 includes an elbow 205, a bulk auger 210, a dispensing chute 215 and a delivery auger 220 disposed on a frame 225. To facilitate movement of the augers 210, 220, one or more motors 230 can be provided that are adapted to engage with the augers 210, 220 in order to rotate the augers 210, 220. Of course, the motors 230 need not engage with their respective augers 210, 220 at the same time, as discussed below in more detail with respect to the process of using the present invention. Further, one or more sensors 233*a-e* can be provided on the delivery system 200 to determine the location of products within the product dispensing device 100. Agitators 235 can also be provided to shake the various components of the delivery system 200 and dislodge products that have coagulated together or are otherwise lodged in place.

The elbow 205 can be shaped as a quarter circle scoop and can receive from the hopper 110 the products that are to be dispensed through the product dispensing device 100. As shown, the elbow 205 is in the closed position. However, the elbow 205 can be hinged to the frame 225 or any other part of the product dispensing device 100, and can rotate away from the bulk auger 210 to allow a serviceman to purge the elbow 205 and/or retrieve the contents of the bulk auger 210. To hold the elbow 205 closed, a flexible cord (e.g., a bungee cord) can be attached to the frame 225 and to the cord attachment 240. Other means of securing the elbow 205 in a closed position can also be used, such as, for example, latches, locks, magnets, and the like. A serviceman can thus easily undo the cord from the frame 225 and purge the elbow 205.

After a product is dispensed through the elbow 205, the product can enter the bulk auger 210. As used throughout this application when referring to the present invention, the term "auger" means an inverted auger that includes an outer barrel and internal spiral flighting extending at least partially from one open end of the barrel to the other open end of the barrel. The inverted auger of the present invention allows an internal wall of the outer barrel to rotate which, in turn, rotates the flighting inside the barrel. The flighting can be either integral with or attached to the outer barrel.

The inverted auger design of the present invention is advantageous to that of conventional augers. Conventional augers include a fixed barrel that does not rotate. Rather, in a conventional auger, contents are transported using a spiral flighting that rotates within the fixed barrel. The conventional fixed barrel design produces several pinch points between the flighting and the barrel that can damage the product being dispensed. In contrast, the auger of the present invention rotates the barrel together with the spiral flighting, creating fewer pinch points and reducing the risk of product damage.

Figure 3A:
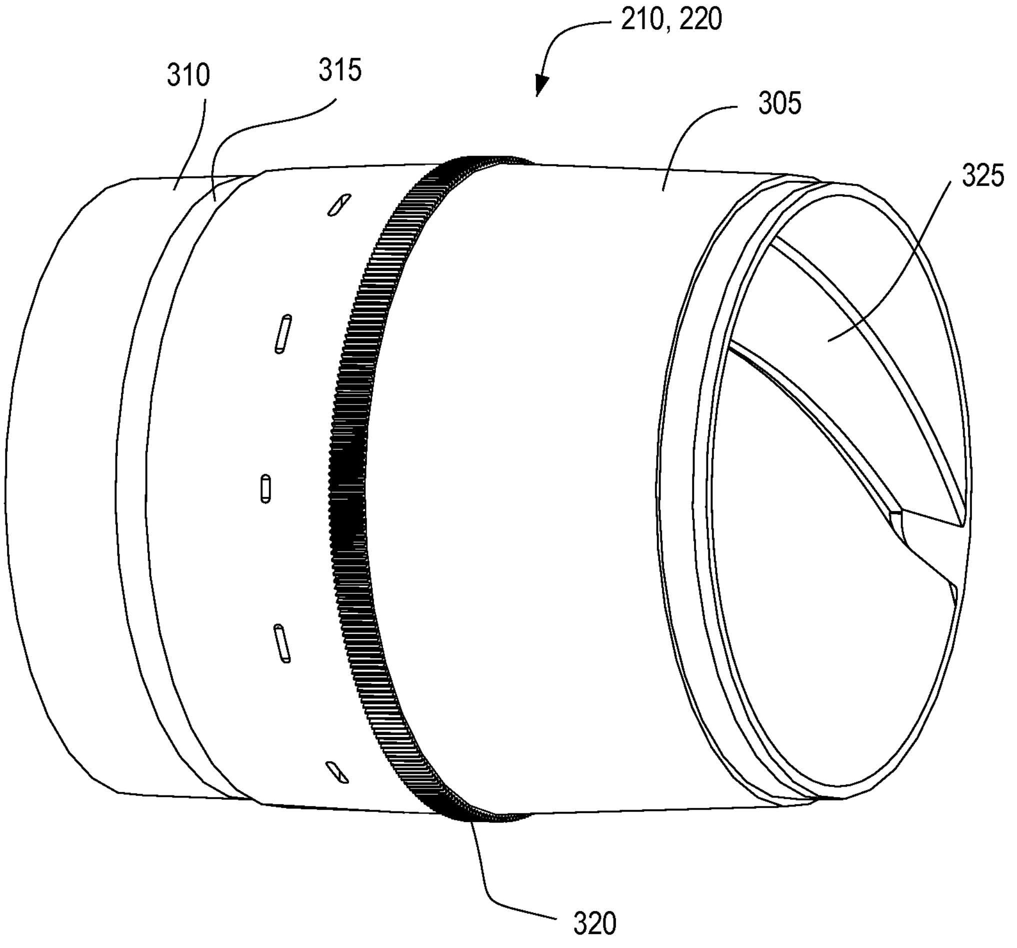
FIGS. 3A-3C illustrate an inverted auger according to the present application.
Figure 3B:
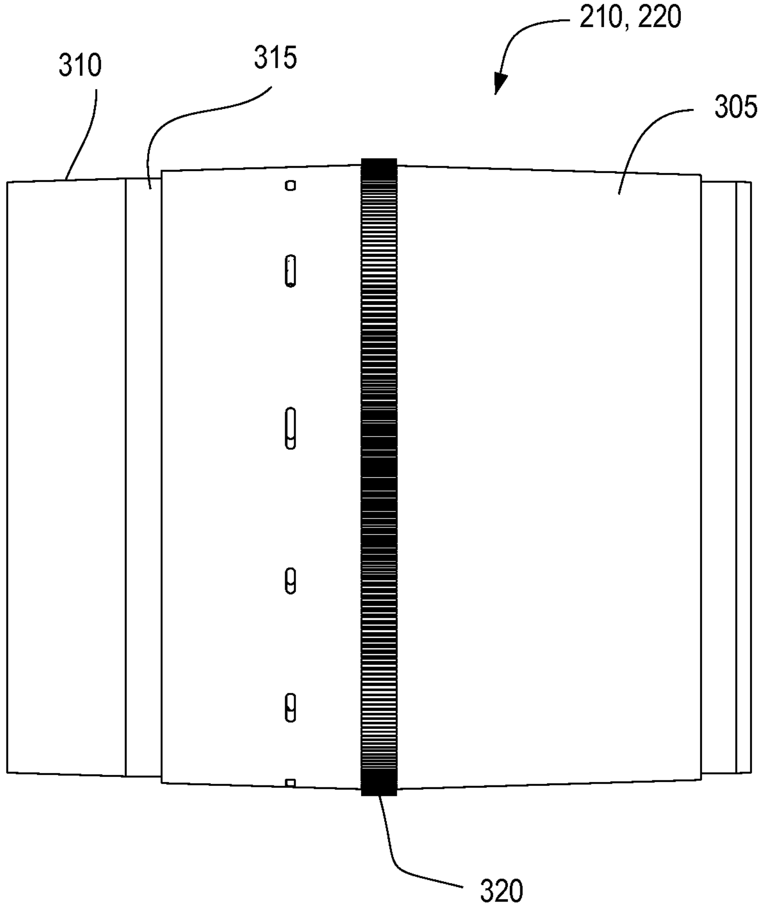
Figure 3C:
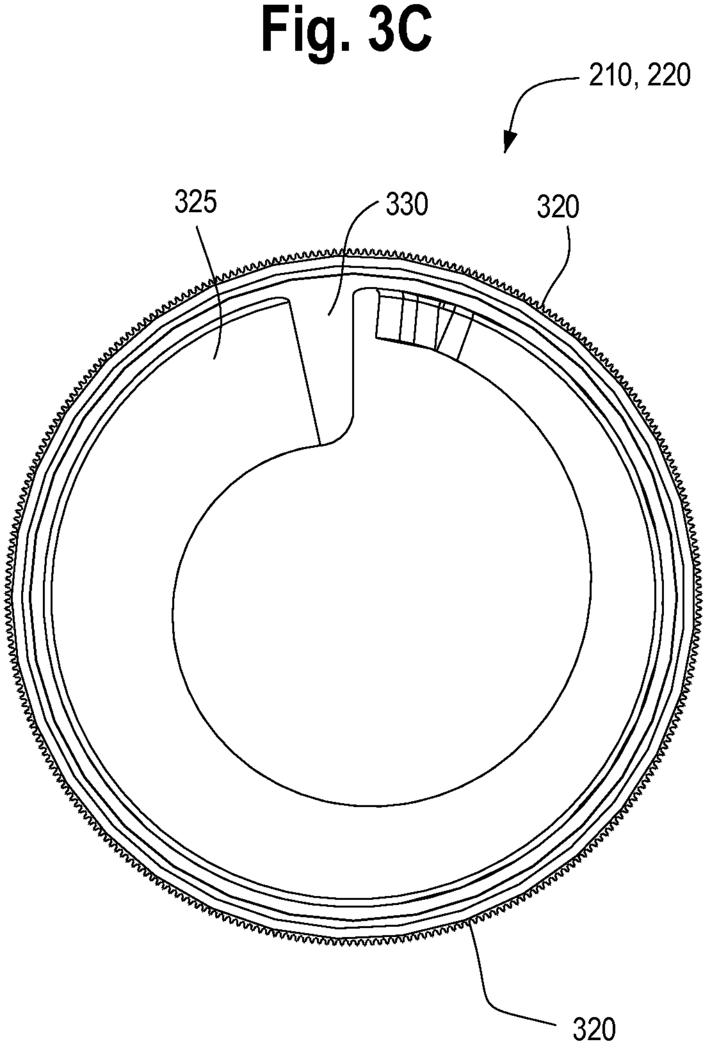

As shown in FIG. 3A-3C, the augers 210, 220 include a main body 305, lower body 310 and a ridge 315 on the outer surface of the auger 210, 220. Further, a worm gear 320 can be provided on the auger 210, 220 for engagement with the motor 230. The auger 210, 220 can be a single injection-molded device or can be fastened together by two or more components. On the inside of the auger 210, 220, spiral flighting 325 is provided with an extending portion 330 that can be located on at least one of the ends of the flighting 325. Mechanical activation of the augers 210, 220 can be by other mechanical means including an axial gear drive, a friction wheel (i.e. rubber wheel on the outer surface of the auger), belt drive or any other appropriate means.

As shown, the main body 305 is displaced from the lower body 310 by way of a ridge 315. The ridge 315 allows for the auger 210, 220 to fit within the frame 225 and rotate therein. The auger 210, 220 also includes two open ends with spiral flighting 325 extending from one open end to the other open end and facilitating movement of individual products from one of the open ends to the other. For example, a product loaded into the hopper 110 can be transferred to the elbow 205, and can thereafter pass into a first open end of the bulk auger 210. The bulk auger 210 can transfer the product to the second open end of the bulk auger 210 and into the dispensing chute 215 by rotating the auger 210 together with the integral or attached spiral flighting 325.

As best shown in FIGS. 3A and 3C, the spiral flighting 325 can include the extending portion 330 on at least one end thereof to grip products as they enter the auger 210, 220 or to separate two of the products so that only one of the products is transferred. The extending portion 330 can be any shape or size that allows for gripping and separation of products. As shown, the extending portion 330 extends at an angle from the spiral flighting 325, i.e., at an angle parallel to the first and second open ends of the auger 210, 220.

As discussed above, the tapered nature of the flighting 325 can contribute to the efficiency of the delivery system 200, together with the friction, rotating speed, angle of inclination, and rotating amount of the auger 210, 220. For example, the flighting 325 can have a flighting height that decreases from the inlet opening to the outlet opening of the auger 210, 220. In a preferred embodiment, the flighting height is two inches at the inlet of the auger 210, 220 and is one-half inch at the outlet of the auger 210, 220. These preferred dimensions represent flighting heights that are adaptable to a variety of products dispensed through the delivery system 200, and different heights can be implemented for different sized or shaped products. The tapered nature of the flighting 325, in combination with the inclination of the auger 210, 220, tends to allow only one product to travel on the flighting 325 nearest the outlet of the auger 210, 220. When multiple products are moved from the inlet to the outlet of the auger 210, 220, the decreasing width of the flighting 325 causes only one sample to be "gripped" and the others to flow towards the inlet of the auger 210 based on gravity.

Various processes can be implemented to increase or decrease the friction of the inside surface of the augers 210, 220. For example, a layer of friction-reducing material, such as Teflon®, may be provided on the inside surface of the auger 210, 220 to reduce the friction to the level necessary to facilitate easy movement of the products. On the other hand, a separate high-friction coating layer may be attached to the inside surface of the auger to increase the friction of the internal surface, if needed. Any other method of increasing or decreasing the friction within the auger 210, 220 can be used within the spirit and scope of the present invention.

Figure 2B:
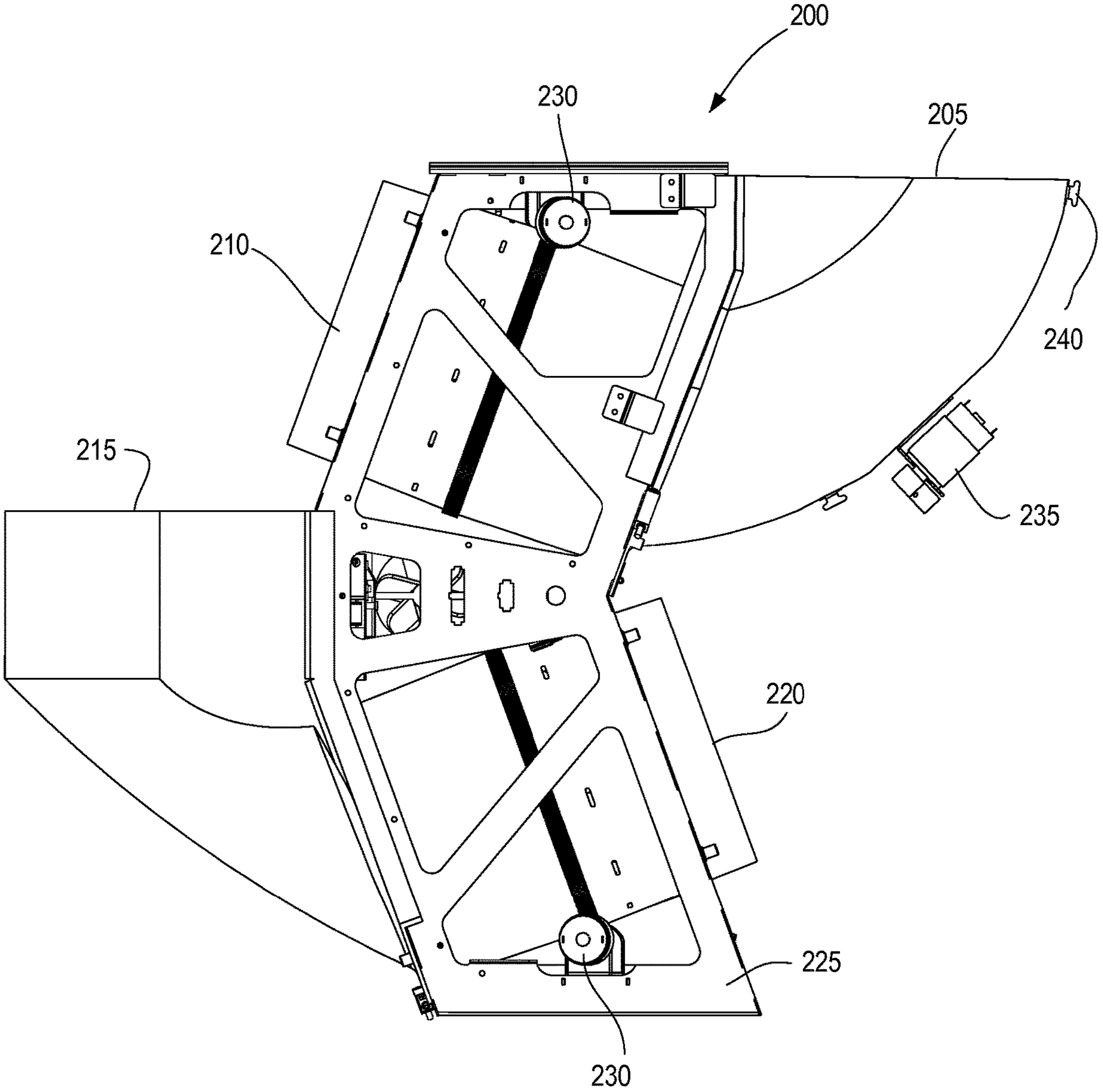
Figure 2C:
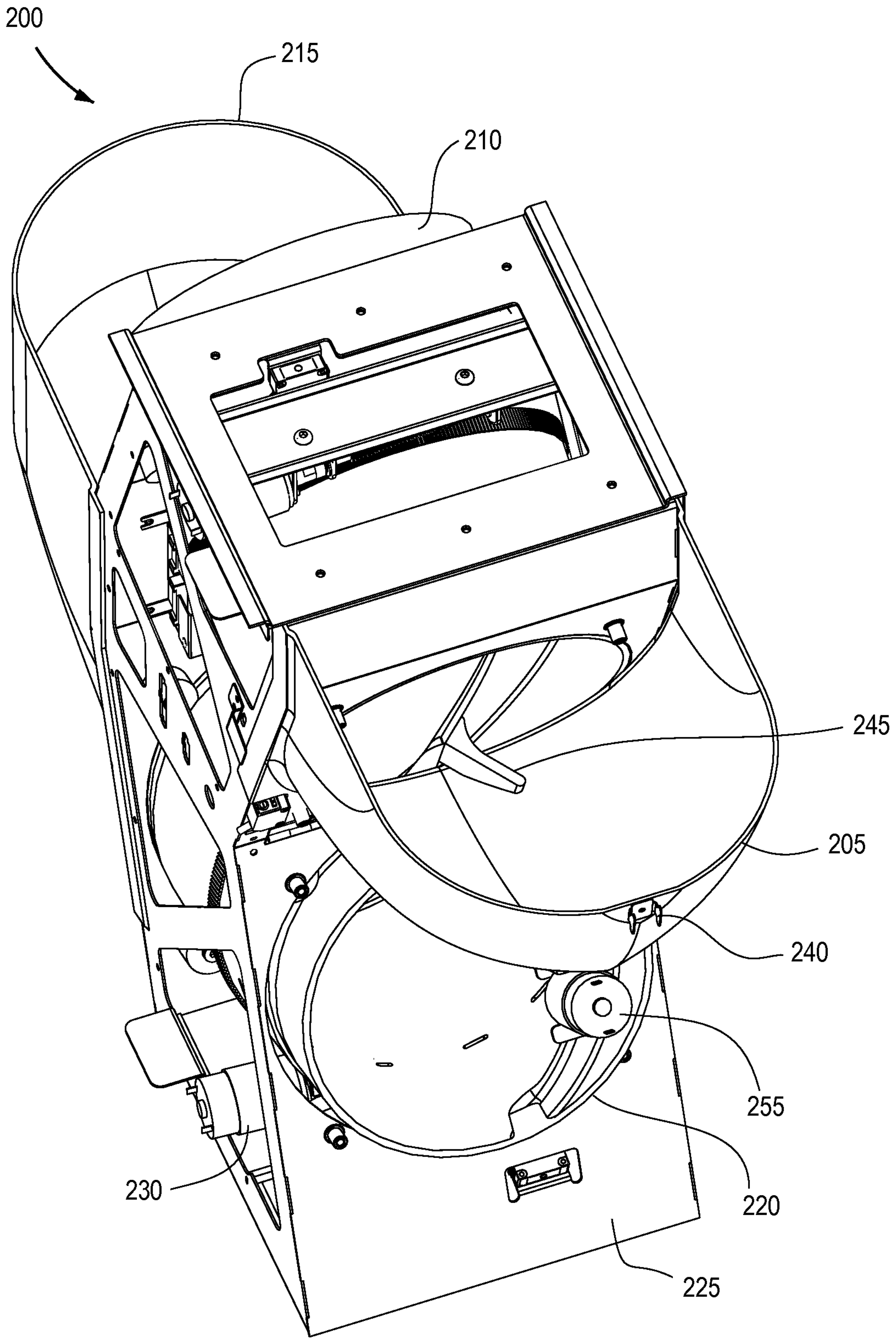

As shown in FIG. 2B, the bulk auger 210 and delivery auger 220 are inclined at an angle relative to the ground plane. The angle of the augers 210, 220 holds the separated products within the auger in a seriatim fashion rather than dispensing all the products at once. To achieve maximum efficiency (i.e., to dispense only one product at a time), the optimal friction, rotating speed, and angle(s) of the augers 210, 220 have been determined. The preferred inclined angle for the augers 210, 220 is approximately 0-30°, and more preferably 20°, relative to the ground plane. The flighting 325 is also designed for optimal efficiency by its tapered nature. The angle of the flighting 325 surfaces can be adjusted to better grip a product and dispense it to the customer. Further, the flighting 325 can extend a particular length to better grip the product.

A tongue 245 can be attached to either one of the bulk auger 210 or the delivery auger 220 and can rotate within either the elbow 205 or the dispensing chute 215, respectively, to disengage products that may have coagulated with one another or that are otherwise lodged within the delivery system 200. As shown in FIG. 2C, the tongue 245 is attached to the bulk auger 210 and can rotate with the bulk auger 210 to move along or "scrape" or otherwise abut the surface of the elbow 205 and dislodge the contents therein. The tongue 245 can also "grip" a product to allow for easier individual dispensation of a product.

Figure 2D:
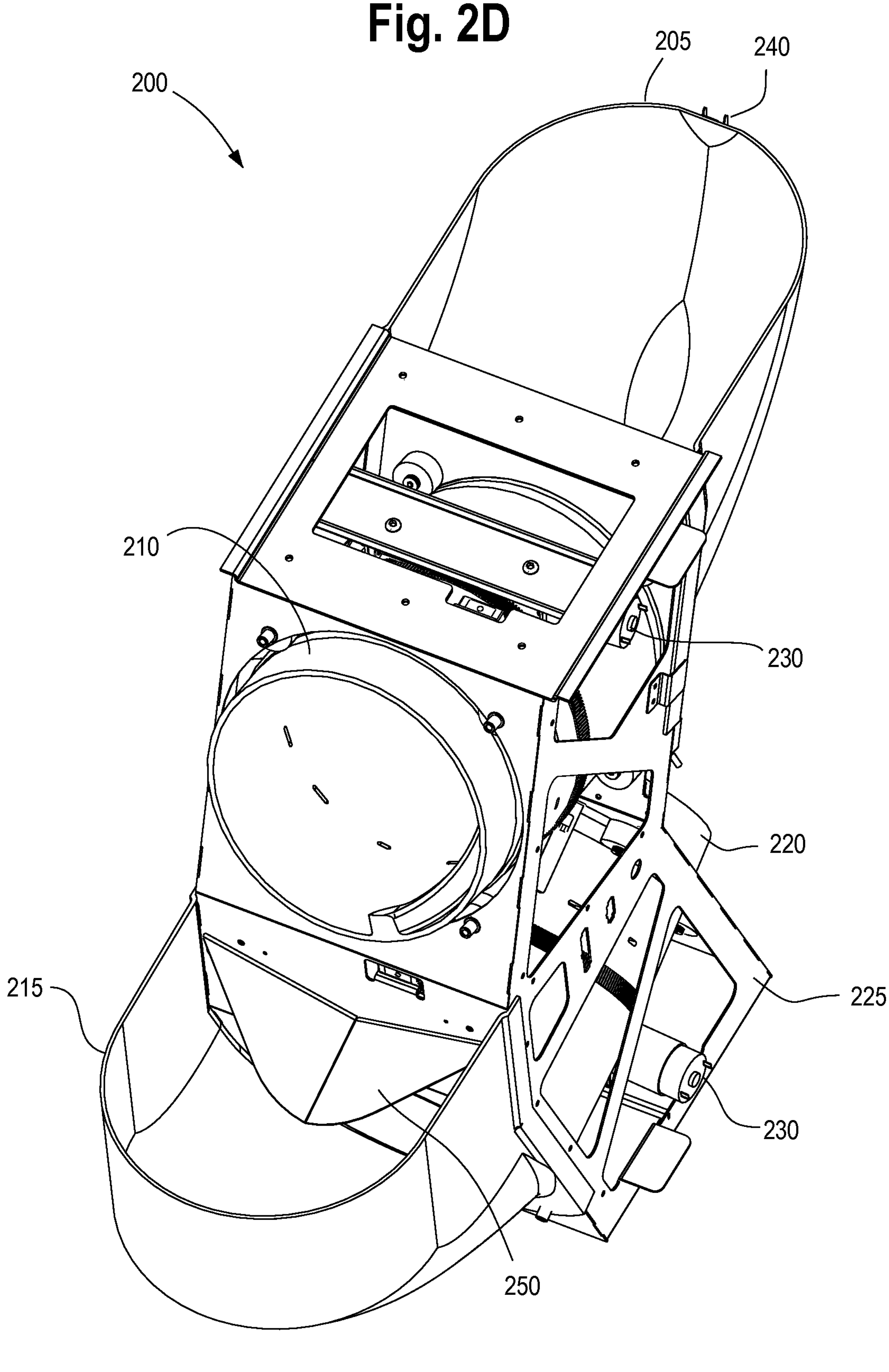

After a product is transferred through the bulk auger 210, the product enters into the dispensing chute 215. As shown in FIG. 2D, a channel 250 can be provided to facilitate entry of a product into the dispensing chute 215 in a serial manner without requiring a serviceman to individually load the product. The channel 250 may be a V-shaped piece of sheet metal or funnel-like structure that directs the product in one area of the dispensing chute 215.

As shown, the dispensing chute 215 is provided at its first open end below an exit path of the bulk auger 210, and communicates at its second open end with the entrance opening of the delivery auger 220. Products can therefore be delivered from the bulk auger 210 into the dispensing chute 215 and then to the delivery auger 220.

Similar to the bulk auger 210, the delivery auger 220 rotates and by way of the spiral flighting 325 provided in the delivery auger 220, can dispense the product out of the second open end of the delivery auger 220 and into the dispensation area 125. As shown in FIG. 3A, the bulk auger 210 and the delivery auger 220 can include substantially similar structure and configuration. However, it is understood that the bulk auger 210 and the delivery auger 220 can be made of different structures without departing from the spirit and scope of the present invention. For example, as discussed above, it is preferred that the bulk auger 210 and the delivery auger 220 are inclined at an angle of approximately 20° to the ground plane. However, the augers 210, 220 may be disposed at different angles from the ground plane consistent with the spirit and scope of the present invention. In addition, the augers 210, 220 can rotate simultaneously by way of the motors 230, or can rotate at different timing or speeds to one another. Other properties of the auger (material, friction, rotation speed, flighting 325 properties, and others) can also be varied without departing from the spirit and scope of the present invention.

The motor 230 facilitates movement of the auger 210 by engaging with the worm gear 320 provided on the outer circumference of the auger 210, 220. As shown, the motor 230 is a worm motor, but any type of electrical or mechanical motor may be provided within the spirit and scope of the present invention. Further, magnetic actuation may be provided to rotate the auger 210, 220 at a preferred speed, acceleration and timing.

The sensor 233*a-e* can be an optical sensor that senses whether an object is present in the hopper 110, the elbow 205, the dispensing chute 215 or either of the augers 210, 220. For example, a sensor 233*a-e* can be provided above the delivery auger 220 to sense objects within the delivery auger 220. However, sensors 235 can be provided within or outside of the different components of the delivery system 200 to sense objects within the hopper 110, the elbow 205, the bulk auger 210, the dispensing chute 215, or the delivery auger 220, or any combination of the above.

The sensors 233*a-e* can actuate various agitators 235 to dislodge products that have been lodged in the system or have coagulated with one another. For example, the agitator can be an off-balanced or eccentric weight that is connected to a motor, and where the motor vibrates the weight in order to agitate the products therein. The agitator can be activated by either manual actuation (i.e., by way of the touch-screen display 215) or automatically if one or more of the sensors 233*a-e* detect that products are not being dispensed properly.

The sensors 233*a-e* can be located inside the delivery system 200 component itself, or can be positioned outside of the component but in a position to sense objects within the component. For example, the sensor 233*a-e* can be connected to the elbow 205 but sense objects within the delivery auger 220. However, the sensor 233*a-e* could be located directly within the delivery auger 220 to sense objects therein. Other sensor combinations can be implemented to determine the location of product(s) or the functionality of the delivery system 200 without departing from the spirit and scope of the present invention.

The sensors 233*a-e* can be connected to one another such that the precise location of products within the delivery system 200, if any are present, can be determined. For example, a first sensor 233*a* can be provided to sense objects in the hopper 110, a second sensor 233*b* can be provided in the elbow 205, a third sensor (not shown) can be provided at an inlet opening of the bulk auger 210, and a fourth sensor (not shown) can be provided in the outlet opening of the bulk auger 210. Additional sensors 233*c-e* can be provided in other areas of the delivery system 200. Also, a similar sensor 233*a-e* configuration can be provided in the dispensing chute 215 and delivery auger 220. If the second sensor 233*b* in the elbow 205 does not sense a product but the first sensor 233*a* senses that objects are present in the hopper 110, the delivery system 200 will determine that products are lodged in the hopper 110 and will actuate an agitator in the hopper 110 to dislodge the products. Similarly, if the third sensor fails to sense any product in the bulk auger 210 but the second sensor 233*b* senses products in the elbow 110, the delivery system 200 can actuate the agitator 235 in the elbow 110 and dislodge products in the elbow. Within the bulk auger 210, if products are sensed at the inlet opening but not at the outlet opening, the tongue 245 can be actuated to dislodge products that are within the bulk auger 210. If all of the sensors 233*a-e* fail to detect any product, the delivery system 200 will determine that no products are available to be dispensed and will issue an “Out of Product” notice to the consumer and/or the service technician. Of course, the above example was applied to only the hopper 110, elbow 205, and bulk auger 210, but the present invention is not so limited. The general concept of communicating information from downstream sensors 233*a-e* to upstream agitators can be implemented in any way and in combination with any component of the present invention.

Another application of the sensors 233*a-e* is to save power that is applied to the augers 210, 220 and to avoid over-rotation of the augers 210, 220. When a product is dispensed through the delivery system 200, the bulk auger 210 can rotate until the product is sensed by a sensor 233*c* located in or around the dispensing chute 215. Once the product is sensed in the dispensing chute 215, the delivery system 200 knows that the product has exited the bulk auger 210 and thus stops rotation of the bulk auger 210. The same principle can be applied to the delivery auger 220 as well—rotating the delivery auger 220 until a product is sensed at either the outlet opening of the delivery auger 220 or downstream in the product dispensation area 125. Other combinations of the above can be implemented within the spirit and scope of the present invention.

As shown, the delivery system 200 includes two augers—a bulk auger 210 and a delivery auger 220. However, the present invention is not limited to a two auger system, and can include one, two, three, or more augers. For example, a single auger can be implemented and can include substantially the same structure as the bulk auger 210 or the delivery auger 220. The single auger can include a barrel portion and internal flighting that is either integral with or attached to the internal wall of the barrel portion. The auger can thus rotate as a whole—with both the barrel and flighting rotating together—to reduce pinch points and avoid substantial damage to the product as compared to the conventional fixed barrel and rotating flighting design.

The single auger system can distribute products more efficiently by manipulating the properties of the products themselves. For example, the size, weight, shape, volume, or friction of the products can be altered to improve the efficiency of distribution through the single auger or multiple auger system. The single auger system can also be implemented in combination with another singulation device that dispenses objects in a one-by-one fashion or that divides bulk-loaded objects into single samples, for example, a dividing barrier or ramp.

Figure 6:
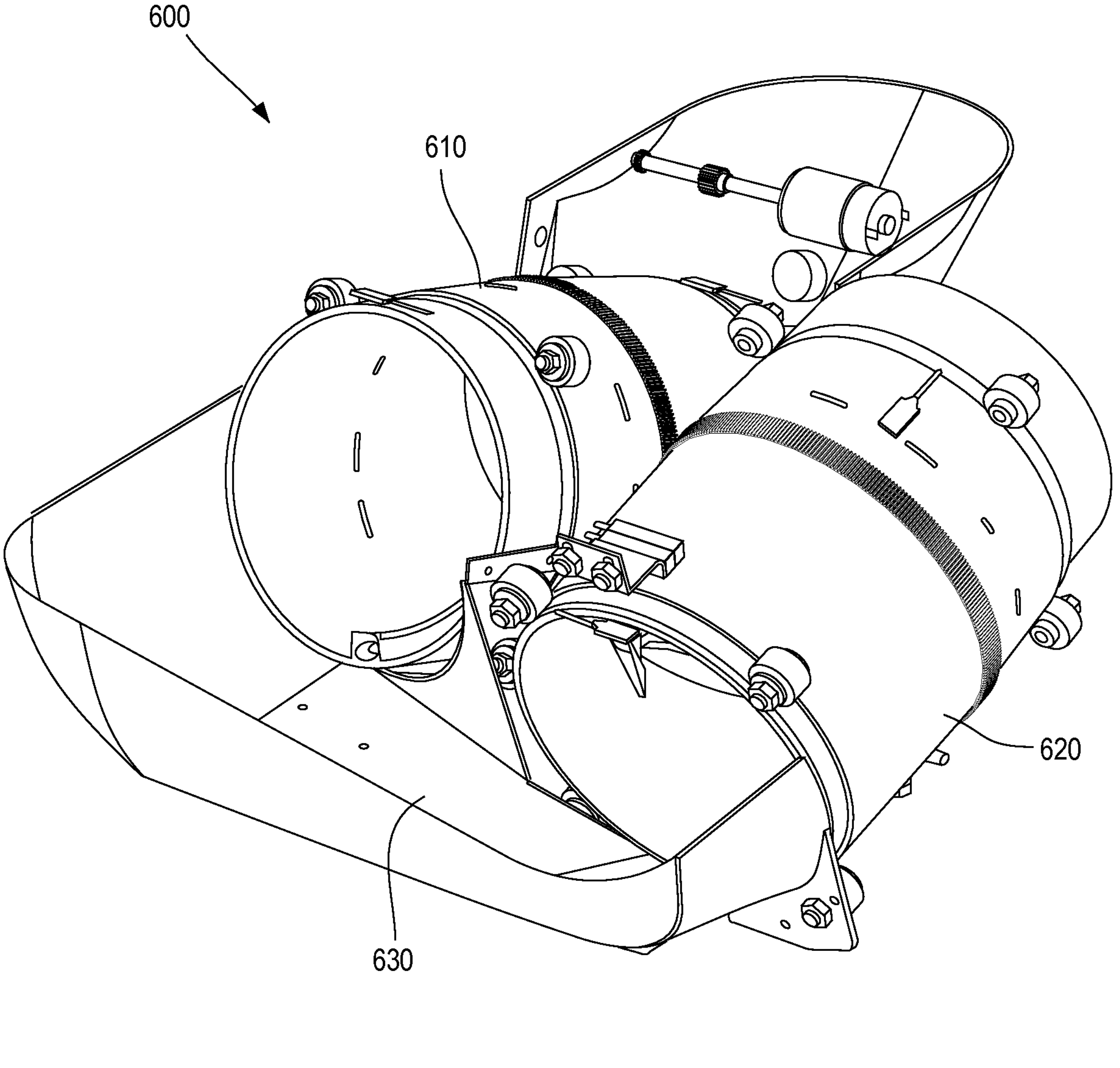
FIG. 6 illustrates a horizontal auger embodiment of the present application.

As shown, the delivery system 200 includes multiple augers 210, 220 with the bulk auger 210 directly above the delivery auger 220. However, as shown in FIG. 6, another type of delivery system 600 can include augers 610, 620 disposed horizontal to one another and communicating with one another via a deflector plate 630. Products can thus be dispensed into the hopper 110 and eventually be transmitted to the bulk auger 610. The bulk auger 610 can then rotate and transfer the product, by way of the transfer ramp 630, into the delivery auger 620. The delivery auger 620 thereafter rotates and dispenses the product into the product dispensation area 125. The horizontal auger embodiment is advantageous for spacing purposes where a more vertical design is not plausible, e.g. in a low ceiling area.

Figure 4A:
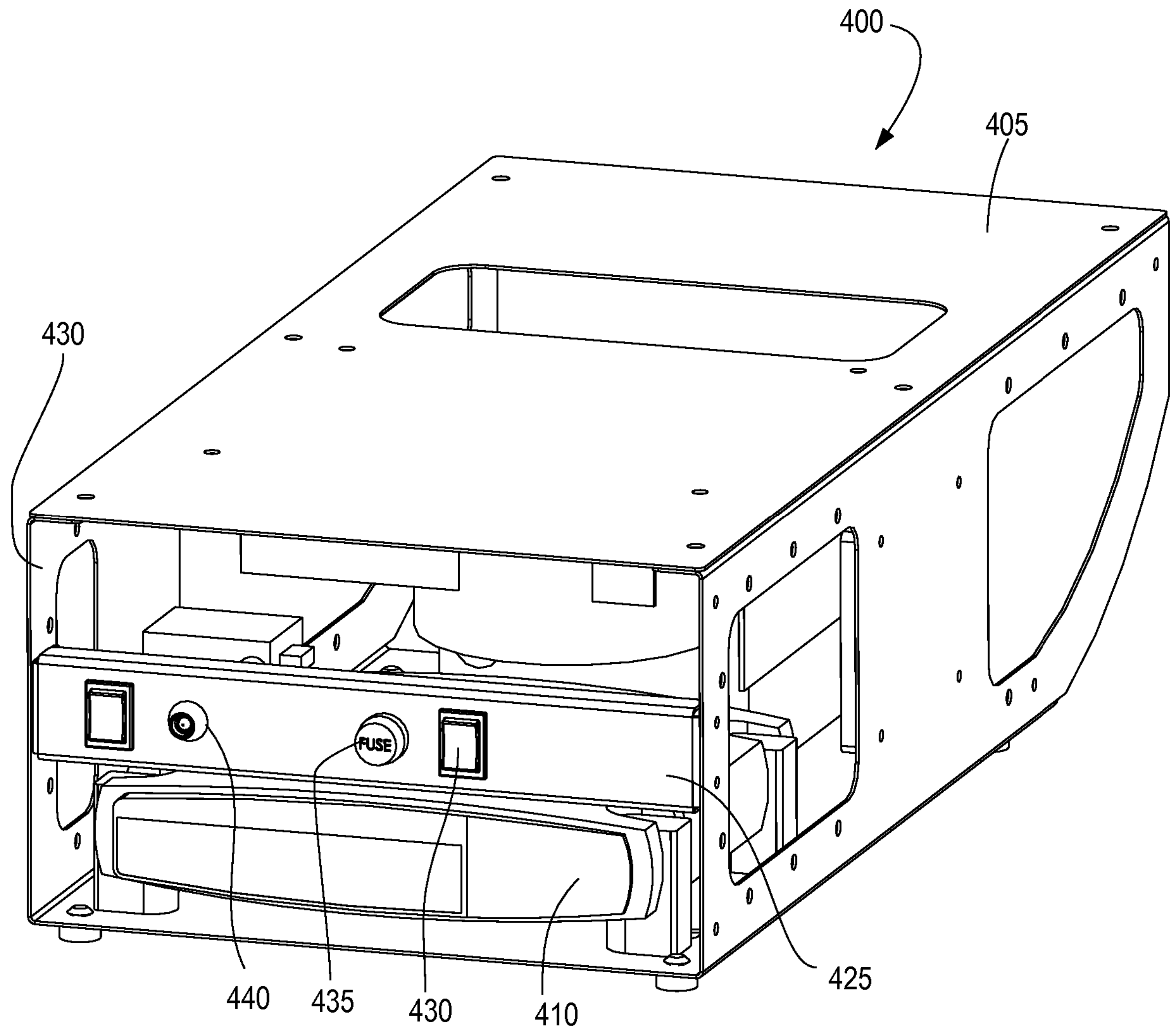
FIGS. 4A-4B illustrate an electronic console according to the present application.
Figure 4B:
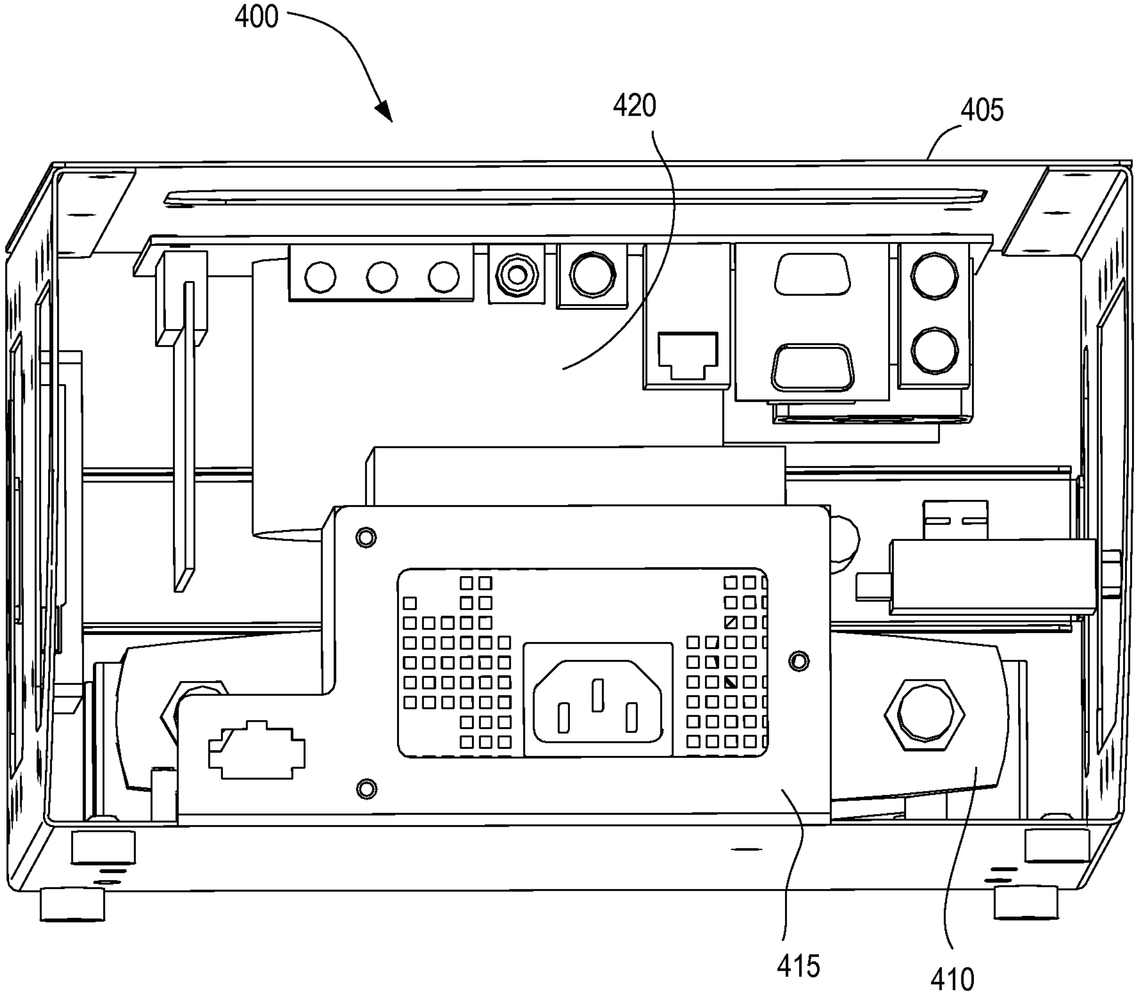

With reference to FIGS. 4A and 4B, an electric console 400 of the present invention is disclosed. As shown, the electric console 400 includes a bracket 405 that acts as a backbone for the contents of the electric console 400. A wireless router 410, power source 415, mother board 420 and a mounting plate 425 can be attached to the bracket 405. Attached to the mounting plate 425 are one or more switches 430, a fuse 435 and a functionality indicator 440.

The power source 415 can deliver power to the electrical components of the product dispensing device 100, for example, the display 115 and the scanner 120. In addition, the power source 415 can supply power to the delivery system 200 or the delivery system 200 can include its own power source and electric console. In a preferred embodiment, the power source is connected to a standard wall socket or surge protector to provide electrical power to the product dispensing device 100.

The power source 415 can also include a battery that is operative to power the product dispensing device 100 when the motherboard 420 determines that the product dispensing device 100 is not being adequately powered by the standard wall socket connection. Optionally, when the power source 415 switches from a standard wall socket connection to a battery connection, the access point 140 may contact an external computer and notify the necessary personnel that the product dispensing device 100 is operating on temporary power.

The motherboard 420 provides the controlling backbone of the product dispensing device 100 and includes computer components necessary for the product dispensing device 100 to function. For example, the motherboard 420 can include a memory and a processor for transmitting video or images to the display 115, data relating to the number of times a user has swiped their card, data relating to the maximum number of user accesses that are permitted, or any other form of relevant data. The motherboard 420 can also store the general operating system for the product dispensing device 100 and can control functionality of the scanner 120 and delivery system 200. For example, the motherboard 420 can instruct the delivery system 200 to rotate the augers 210, 220 at a precise speed or speeds determined based on the friction and angle of inclination of the augers 210, 220 and status of sensors. Various algorithms may be stored in the memory of the motherboard 420 to determine the necessary speed and timing of rotation for the augers 210, 220, which, as discussed above, can vary between the augers 210, 220. Alternatively, a separate motherboard 420 may be provided with the delivery system 200 for precise controlling of the delivery system 200.

The motherboard 420 can transmit data stored in its memory to an outside computer as necessary. For example, when the memory is almost full, the motherboard 420 can communicate with the access point 120 and transmit the contents of the memory to an outside computer. In this manner, the outside computer can store data relating to the number of accesses for a particular product, the amount of product remaining, or other operating parameters without requiring a visit to the product dispensing device 100. The motherboard 420 can also transmit memory contents to an internal or external permanent storage when the motherboard 420 determines that the power source 415 is running on battery power.

The mounting plate 425 can include one or more switches 430 for actuating electrical components attached to the product dispensing device 100. In addition, a fuse 435 can be provided for protecting the product dispensing device 100 against electrical surge, and a functionality indicator 440 can be provided to indicate whether the electrical components of the product dispensing device are operating effectively.

The motherboard 420 can also include a coupon dispensing program to dispense a product coupon to a user, typically for the product being dispensed through the product dispensing device 100. For example, the motherboard 420 can store and execute a coupon distribution program to dispense coupons to the customer via a coupon printer (not shown) or wirelessly to the card or other identifying indicia of the user. The coupon can provide additional discounts to the user of the device 100 for extra incentive to purchase the product.

The coupon dispensing program can vary the dispensing process from consumer to consumer. For example, the coupon distribution program can identify the buying habits of the consumer as they pertain to the product being dispensed. Naturally, a consumer who frequently purchases the product being dispensed would need a smaller incentive to purchase the product again based on their frequent buying habits. However, a consumer who has not yet purchased the product may need an additional incentive. The product dispensing program can thus identify the user, analyze their buying habits based on data transmitted to or stored by the motherboard 420, and can selectively dispense or omit dispensing a product coupon to a user. Any other method can also be used to control shopper behavior based on incentivized discounts, in addition or alternately to the above.

Figure 5:
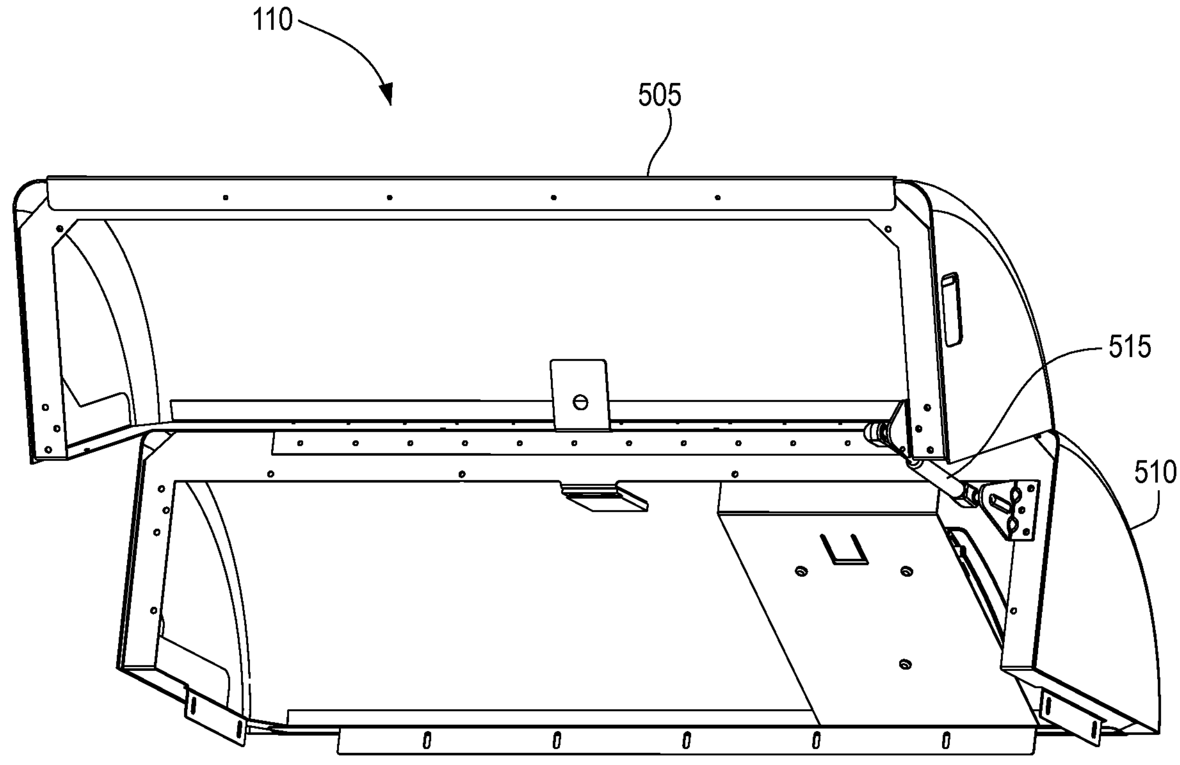
FIG. 5 illustrates a hopper according to the present application.

A hopper 110 in accordance with the present invention is shown in FIG. 5. As shown, the hopper 110 includes a lid 505 and a support 510 attached by way of a hinge. A cylinder 515 is also provided and is connected to both the lid 505 and support 510 for resisting the force of gravity when the lid 505 is in the upward position. The cylinder 515 may also include a locking mechanism (not shown) for locking the cylinder 515 in place when the lid 505 is in the open position.

The process of using the product dispensing device 100 will now be discussed. Using a card with an identification number, a user can scan the card against the scanner 120 to transmit the identification number to the product dispensing device 100. The motherboard 420 of the product dispensing device 100 will then determine whether the identification number has already been scanned the maximum number of times or if the ID listed on the identification card can be dispensed a product from the product dispensing device 100. If the card is eligible to dispense a product, the motherboard 420 will cause the motors 230 to rotate a predetermined amount, at a predetermined speed and at a predetermined time based on the speed and friction of the augers 210, 220 so as to deliver a product from the hopper 110 through the bulk auger 210, into the dispensing chute 215, and then into the delivery auger 220. Again, the motors 230 need not rotate both augers 210, 220 at the same time, and in a preferred embodiment will rotate the bulk auger 210 prior to rotating the delivery auger 220. This reduces the amount of electricity that is used when the auger(s) 210, 220 is rotated but products are located in areas of the delivery system 200 other than the rotating auger(s) 210, 220. Once the delivery auger 220 rotates a predetermined amount and/or speed, a single product is dispensed in the dispensation area 125 where the user can retrieve the product.

If the user scans their card and the motherboard 420 determines that the card is not eligible for product dispensation, the display 115 will alert the user that the product will not be dispensed and that the card has been denied. The display 115 may then give the user instructions for how to obtain a new card, or the reasoning behind why the card was denied (e.g., the card could not be scanned because of a functional error).

A method of servicing the delivery system 200 according to the present application will now be discussed. A serviceman can open the door of the product dispensing device 100 to access the inside of the product dispensing device 100 by disengaging the latch 135 as shown in FIG. 1. The serviceman can then release the cord on the cord attachment 240 and rotate the elbow 205 away from the bulk auger 210 so as to allow the serviceman to purge any products from the elbow 205 and bulk auger 210 upon rotating the elbow 205, the serviceman can also view the contents of the augers 210, 220, and remove any contents from the augers 210, 220. The serviceman can then rotate the elbow 205 upward and against the frame 225, and can reattach the elbow 205 to the frame 225 by way of, for example, a bungee cord. Following this step, the serviceman can then load the hopper 110 with a plurality of products by placing the products loosely into the hopper 110, rather than having to load the hopper 110 one-by-one with products.

Should the serviceman need to change the video or image on the display 115 (e.g., if the new product is being dispensed by the product dispensing device), the serviceman can either do so manually at the site of the product dispensing device 100 or can transmit electronic instructions to the product dispensing device 100 by way of the access point 140. For example, the service technician can scan a card to change the video or image on the display 115, and to otherwise reprogram the product dispensing device 100 to depict a new product. Alternatively, the motherboard 420 can include predetermined instructions to change the contents of the display 115 at a predetermined time to facilitate a change of product being dispensed.

The products that are dispensed from the product dispensing system can generally include free samples, but the present invention is not so limited. For example, the dispensing device 100 can dispense products that require the user to spend money, for example, money that is represented by the customer ID on the card that is scanned by the scanner 120. Further, the products may not be consumer products, but can be any type of substance or product that is capable of being transported within the structure of the product dispensing device 100, for example, toys, gifts, pencils, pens, tools, or any other suitable object.

The matter set forth in the foregoing description and accompanying drawings is offered by way of illustration only and not as a limitation. While particular embodiments have been shown and described, it will be apparent to those skilled in the art that changes and modifications may be made without departing from the broader aspects of applicants' contribution. The actual scope of the protection sought is intended to be defined in the following claims when viewed in their proper perspective based on the prior art.

What is claimed is:

1. A delivery system device comprising:

a hopper adapted to hold objects;

a rotatable bulk auger having opposing first and second bulk auger ends, the first bulk auger end communicating with the hopper to receive one or more of the objects from the hopper, and the second bulk auger end dispensing the one or more objects;

a dispensing chute having a first chute end defining a first extreme end of the dispensing chute and a second chute end defining a second extreme end of the dispensing chute opposite the first extreme end, the first chute end disposed to receive one or more of the objects from the second bulk auger end and convey the one or more objects from the first chute end to the second chute end;

a rotatable delivery auger having opposing first and second delivery auger ends, the first delivery auger end communicating with the dispensing chute at the second chute end to receive the one or more objects, and the second delivery auger end being disposed higher than the first delivery auger end, the delivery auger including a barrel portion extending from the first delivery auger end to the second delivery auger end, the barrel portion having an external wall at an exterior of the rotatable delivery auger and an internal wall at the interior of the rotatable delivery auger, and fighting that extends from the internal wall of the barrel portion, the fighting extending at least partially between the first and second delivery auger ends, the hopper, bulk auger, dispensing chute, and delivery auger dispense the objects along a communication path and the one or more objects are distributed along the communication path from the dispensing chute to the first delivery auger end, the first delivery auger end defining a point of entry from the dispensing chute to the delivery auger at a substantially lower-most portion of the internal wall of the delivery auger such that objects are transferred from the dispensing chute through the point of entry to the lower most portion of the delivery auger and communicated by the delivery auger toward the second delivery auger end.

2. The delivery system device according to claim 1, further comprising:

a worm motor, wherein at least one of the bulk auger and the delivery auger include a worm gear disposed around an outer circumference of the at least one of the bulk auger and the delivery auger, the worm motor adapted to engage with the worm gear to cause rotation of the at least one of the bulk auger and delivery auger upon actuation.

3. The delivery system device according to claim 1, further comprising an elbow communicating with the hopper and the bulk auger.

4. The delivery system device according to claim 1, wherein at least one of the bulk auger and the delivery auger are disposed at an angle of approximately 30 degrees with respect to a ground plane.

5. The delivery system device according to claim 1, wherein the fighting is spiral shaped and includes an extending portion disposed at an end of the fighting and extending at an angle relative to the fighting.

6. The delivery system device according to claim 1, further comprising a tongue coupled to the fighting, the tongue adapted to abut objects adjacent the bulk auger when rotated.

7. The delivery system device according to claim 1, further comprising an interface adapted to identify a user and communicate with an electronic console to cause movement of at least one of the bulk auger and the delivery auger.

8. The delivery system device according to claim 1, wherein the fighting includes a fighting height that is tapered so as to decrease from the first open end to a second open end of the at least one of the bulk auger and the delivery auger.

9. A product delivery apparatus, comprising:

a hopper adapted to hold a plurality of products;

first and second rotatable augers having respective opposing first and second auger ends, the augers indirectly communicating with one another and with the hopper along a communication path, the first auger being located above the second auger, and the second auger including:

a barrel portion extending from the first auger end to the second auger end, wherein the second auger end is disposed higher than the first auger end, the first auger end being disposed to receive at least one of the plurality of products and the second auger end being disposed to dispense at least one of the products; and fighting that extends from an internal wall of the barrel portion;

a dispensing chute having a first chute end defining a first extreme end of the dispensing chute and a second chute end defining a second extreme end of the dispensing chute opposite the first extreme end, the dispensing chute being disposed to receive one or more of the objects from the first auger at the first chute end and convey the one or more objects from the first chute end to the second chute end; and a dispensation area provided at an end of the communication path, wherein the products are dispensed along the communication path from the dispensing chute to the first auger end, the first auger end defining a point of entry from the dispensing chute to the second auger at a substantially lower-most portion of the internal wall of the second auger such that objects are transferred from the dispensing chute through the point of entry to the lower most portion of the second auger and communicated by the second auger toward the dispensation area.

10. The product delivery apparatus of claim 9, further comprising:

an interface adapted to identify a user and communicate with an electronic console to cause the electronic console to begin movement of at least one of the plurality of augers.

* * * * *